United States Patent Office 2,849,459
Patented Aug. 26, 1958

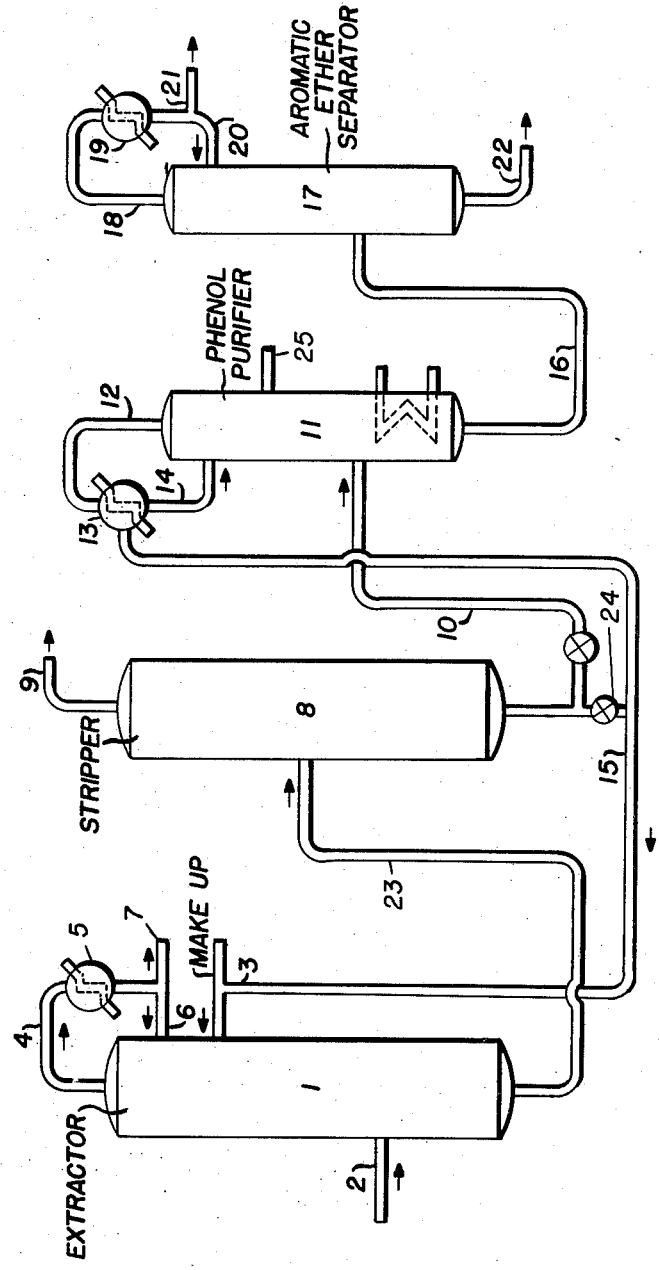

2,849,459
PREPARATION OF CHROMANS, CHROMENES, AND COUMARONS

Robert F. Leary, Cranford, and Joseph F. Nelson, Westfield, N. J., assignors to Esso Research and Engineering Company, a corporation of Delaware Application June 22, 1953, Serial No. 363,264

10 Claims. (Cl. 260—345.5)

This invention is concerned with the formation, utilization and separation of distinctive aromatic cyclic ether compounds produced by a reaction of phenol with certain unsaturated hydrocarbons in a mixture containing various olefins and diolefins such as are present in benzene and toluene-containing cracked naphtha fractions.

Despite the complexities of the highly cracked mixtures of $C_5+$ hydrocarbons, a very unexpected selective production of the aromatic cyclic ethers has now been obtained. It has now been found that these distinctive aromatic cyclic ether compounds could be beneficially formed, utilized, and isolated as will be further explained.

Contrary to earlier notions about phenol sludge formation, it has now been discovered that unsaturated hydrocarbons in the $C_5+$ cuts can be made to react selectively with a major proportion of phenol to produce the aromatic cyclic ethers of the chroman, chromene, and coumaran types. These ethers can be isolated from the ordinarily known phenol sludge compounds which are substantially higher boiling and differ in other properties.

The selective formation of the aromatic cyclic ethers, the control of their concentration, and their isolation are important factors in the purification of the aromatic hydrocarbons, such as benzene, toluene and xylenes with phenol or other phenolic solvents, e. g. cresylic acids.

The aromatic cyclic ethers have the required heat stability and volatility for separation with the phenol from the ordinary phenol sludge materials which are higher boiling. The aromatic cyclic ethers can be allowed to form and accumulate at a certain rate to permit the phenolic solvent to function properly in the extractive distillation operation with avoidance of plugging, foaming or other difficulties.

The manner in which the aromatic cyclic ethers are to be produced, used and isolated during an extractive distillation of a highly cracked aromatic-unsaturated hydrocarbon feed mixture will be described with reference to the drawing.

In the drawing is shown a schematic flow plan for the treatment of the aromatic-unsaturated hydrocarbon feed with phenol for isolation of the produced aromatic cyclic ethers.

Referring to the drawing, the crude hydrocarbon mixture to be treated is fed into the extraction tower 1 from line 2. The phenol solvent is fed at an upper point of tower 1 from line 3 to flow countercurrent to the raffinate hydrocarbon vapors being distilled overhead from tower 1. The total solvent to feed ratio and the hydrocarbon reflux from condenser 5 and line 6 are adjusted so that the concentration of solvent on the tower plates is about 50 to 85 or 90 percent by weight. A portion of the condensate is refluxed by line 6 and the remaining raffinate product of nonaromatic hydrocarbons is removed through line 7. A reflux ratio of 1 to 6 parts reflux to 1 of raffinate product may be used.

The extraction tower 1 may be equipped with about 30 plates below the feed point of line 2 and about 15–20 plates above the feed plate to the inlet of the phenol solvent from line 3. 5 to 10 plates may be used in the upper part of the tower above the solvent inlet from line 3. The number of plates in each section will be varied depending on the hydrocarbon feed composition and the aromatic being recovered.

The phenol solvent containing extracted benzene and/or higher aromatic hydrocarbons will also tend to contain unsaturated hydrocarbons and reaction products of unsaturated hydrocarbons which are of high molecular weight. This residual extract becomes heated to temperatures of the order of 330° F. (165° C.) and higher, depending on the tower pressure and extract strength. Extract bottoms product of tower 1 is passed by line 23 into tower 8 to fractionally distill the extracted aromatic hydrocarbons away from the solvent and higher boiling compounds left in the solvent. A bottoms temperature of up to about 415° F. (214° C.) is maintained in tower 8, which is provided with sufficient plates to take overhead through line 9 the aromatic hydrocarbons.

The bottoms product of tower 8 is the residual phenol solvent with higher boiling compounds. A major portion of the bottoms from tower 8 can be recycled by lines 24 and 15 to tower 1 so long as its sludge content is low, e. g., less than 5–10%.

Another portion of the bottoms product from tower 8 is passed by line 10 to the tower 11. Tower 11 is equipped with sufficient plates for distilling overhead phenol. This overhead phenol is passed by line 12 to cooler and condenser 13. A portion of the condensed phenol is refluxed through line 14 and a remaining portion of the condensed phenol may be returned by line 15 for use in the extraction tower 1. Tower 11 can be operated to keep substantially all compounds higher boiling than phenol in the residual or bottoms product subjected to reboiling at the bottom of tower 11 and withdrawal and residue.

Alternately, tower 11 can be operated to distill a substantial part of the aromatic cyclic ethers with the phenol and/or to form an intermediate fraction of these ethers for withdrawal as a side stream by line 25.

The residual or bottoms product of tower 11 is passed by a line 16 into aromatic ether separation tower 17. The residual aromatic ether compounds are distilled overhead from tower 17 through line 18 to cooling condenser 19, a portion of the condensed aromatic ethers may be refluxed by line 20 and the remaining distilled aromatic ethers are withdrawn by line 21 as a purified aromatic ether product. The remaining sludge materials are withdrawn as a bottoms product from tower 17 through line 22.

The aromatic cyclic ether type compounds referred to were isolated from the bottoms of stripping tower 8 in which benzene is removed by thermal stripping from the phenol. They were also isolated from the bottoms of the phenol distillation tower 11. These facts indicated that the aromatic ether type compounds could be formed in the extractive distillation column 1 if the proper feed was used in this tower to supply the correct reactive unsaturated hydrocarbons. It was found that up to about 60 weight percent of the material higher boiling than phenol present in the phenol were the aromatic cyclic ether type compounds. These aromatic cyclic ether type compounds boil mainly in the range of 230–255° C., and have high heat stability. The higher boiling materials or sludge materials contain alkylated phenols and polymerized hydrocarbons. The type of structure belonging to the aromatic ether type compounds are as follows:

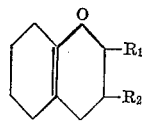

Chroman Type
Chromene Type
($R_1$, $R_2$, or ether ring unsaturated)

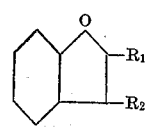

Coumaran Type

In the structure shown the $R_1$ and $R_2$ substituent groups represent aliphatic hydrocarbon and/or hydrogen substituents. The aliphatic groups may contain generally 1 to 4 carbon atoms as in methyl, ethyl, propyl, isopropyl, and butyl or olefinic groups.

As a result of mass spectroscopic analysis and carbon-hydrogen analysis of the aromatic cyclic ether type compounds it was determined that many of these compounds had average empirical formulae of $C_{12}H_{14}O$ and $C_{12}H_{16}O$. Infrared analysis showed that oxygen exists in an ether linkage and that part of the molecule is aromatic in nature.

The chemical test showed that the aromatic cyclic ether type compounds have the chemical stability associated with aromatic cyclic ethers, i. e., no substantial reaction with zinc or sodium. They can be degraded by hydriodic acid at elevated temperatures and in the presence of dehydrated agents. The degradation products are largely polymeric. To obtain a still better understanding of the aromatic cyclic ether type compounds, compounds of similar properties were synthesized by reaction of phenol with $C_6$ diolefins, and particularly methylpentadiene. The desired reaction was made to take place at a controlled rate by heating the reaction mixture to certain temperatures, e. g. in the range of 120° to 270° C. and with various materials to study catalytic activity. The method of synthesis is described in the following example:

EXAMPLE

Phenol (436 g.) and methylpentadiene (52 g.) were heated to the refluxing temperature of the mixture. The temperature of the reaction mixture rose from 121° C. to 144° C. in three hours. An addition of 30 g. of methylpentadiene brought the refluxing temperatures back to 121° C., indicating a reaction rate of about 17% per hour based on the diene.

Refluxing was continued until the temperature rose to 185° C. A simple distillation gave 120 g. (70 mole percent yield) of material boiling at about 240°–270° C. An additional 29 g. of forerunnings and 20 g. of bottoms were observed, so that the conversion of methylpentadiene was substantially complete.

The 240°–270° C. material (density 0.979, $N_D^{20}$ 1.5330) showed only 4% of material insoluble in 10% caustic. The material soluble in the caustic is indicated to be alkylated phenol or is indicated to be a phenol attached to an unsaturated aliphatic group. Continued refluxing of the alkyl phenol or phenol having an unsaturated aliphatic side chain at 250° C. gave little or no evidence of ring closure. After 3 hours only 5% of the mixture was caustic insoluble. This test proved that it was possible to form the sludge type compounds (alkenylated phenols and polymeric products), which are not aromatic cyclic ethers, by reaction of phenol with unsaturated hydrocarbons.

In further tests the phenol and methylpentadiene addition product (alkenylated phenol) was heated in the presence of about an equal amount of iron filings. The reflux temperature dropped rapidly, and after heating for about 3 hours a sample of the product was tested and was found that 45% of the product was caustic insoluble. Continued refluxing in the presence of iron filings increased the yield of caustic insoluble material to 55–60% based on the amount of addition product. A 230°–250° C. cut of the caustic insoluble material showed a density of 0.99 and a refractive index of 1.522. The caustic-insoluble material synthesized corresponded to the mass spectra and infrared analysis similar to the $C_{12}H_{16}O$ aromatic ether type compounds formed from the aromatic concentrates containing principally diolefins and unsaturated hydrocarbons as contaminants. There are indications that the chromenes ($C_{12}H_{14}O$) are reaction products of phenol plus trienes.

The foregoing tests on the synthesis of the aromatic cyclic ether type compounds are useful in determining the conditions under which phenol reacts with the various $C_6$ and higher unsaturated hydrocarbons during the purification of aromatic hydrocarbons by extractive distillation. The following tests were conducted on a phenol extract material from a benzene recovery process.

The impure phenol extracting agent, such as is removed at the bottom of column 8 from the aromatic hydrocarbon stripper was distillled under reduced pressure to collect various cuts. It was found that up to about 25 weight percent of material was higher boiling than phenol. A rough cut of the impure phenol remaining as bottoms in phenol purifier tower 11 was also fractionated. It was found that only a small amount of the impurity boiling above the boiling point of phenol would distill over with the phenol if column 11 is properly operated. For example, it was noted that tower 11 can be operated to leave only 0.03 weight percent of impurity in the recycle phenol which is taken overhead by line 12.

About 57% of the residual material was distilled as an intermediate fraction as in tower 17 to obtain a cut boiling in the range of 234° C. to 240° C. This material was water white, insoluble in 10% aqueous caustic solution, showed a density of 1.01 (close to 0.99) and a refractive index of 1.5297. Mass spectroscopy and infra red spectroscopic examination indicated these materials to be aromatic cyclic ethers. It is quite apparent that this concentrate is composed principally of aromatic cyclic ether type compounds such as those synthesized by reaction of the phenol with methylpentadiene under the proper conditions specified. The higher boiling fractions of the remaining sludge distilled at about 270° C. and were yellow. They were soluble in caustic, and had a higher specific gravity and higher refractive index. Mass spectroscopy showed that the molecular weight of the lower aromatic cyclic ether type fractions were substantially equivalent to phenol attached to a $C_6$ diene. The boiling points, solubility characteristics, and acetyl numbers indicated that the water white intermediate fraction materials were aromatic ethers while the residual sludge compounds were more like alkylated phenols.

The refractive indices and densities of the aromatic cyclic ether type fractions boiling in the range of about 220° C. and 240° C. shows that these compounds are not simple ethers having an ether linkage between a benzene ring and an open-chain aliphatic group. These values are substantially higher than those of such simple ethers and are closer to the values of the cyclic ethers as shown in the following table:

Table I.—Comparison of cyclic ethers from phenol reacted with dienes

| Compounds | Boiling point, °C. | Refractive index, $N_D^{20}$ | Density, $d_4^{20}$ |
|---|---|---|---|
| Synthesized from phenol and methylpentadiene | 230–250 | 1.522 | 0.99 |
| Recovered from phenol extract sludge | 208–255 | 1.53 | 1.02 |
| 2,2 dimethyl chromene | | 1.549 | 1.016 |
| 2,2-dimethylchroman | 225 | 1.549 | 1.008 |
| 2-n-propyl coumaran | 240 | 1.5202 | 0.998 |
| Hexenyl phenol | | 1.505 | 0.95 |
| Isoamyl phenol | 255 | | |

The above information was used to show that the aromatic cyclic type ether compounds which were being recovered from the phenol extract from the benzene recovery process were close in nature to the coumarans, chromenes, and chromans listed. Higher molecular weight compounds are obtained when recovering higher aromatics.

The aromatic ether type compounds separated from the phenol and the phenol sludge were subjected to caustic washing for removing some color bodies, then were refluxed for long periods, such as 20 hours, at their boiling points, e. g. about 238° C. and showed little change in boiling point or decomposition. The high heat stability of the aromatic ether type compounds described makes their presence in the phenol advantageous up to a certain point. By letting them form and build up in the bottoms of tower 1 and tower 8 they act as a fluxing medium for the high molecular weight phenol sludge compounds. Further, the presence of these compounds reduces the phenol concentration, and thus cuts down loss of phenol by chemical or physical means. In the phenol purifying tower 11, the aromatic cyclic ether type compounds help to volatilize the phenolic solvent without excessive temperature rise in reboiling the bottoms.

The rate of formation of the aromatic cyclic ethers can be controlled as pointed out previously by supplying suitable amounts of the diolefinic reactants, particularly the open-chain branched $C_6$ dienes, such as methylpentadiene, by catalyzing the reaction and by maintaining the reaction mixture at sufficiently high temperatures for adequate time to permit the formation of the aromatic ethers. The rate is also controlled by the proportion of recycled aromatic cyclic ethers.

Tests have shown that the aromatic ethers can be tolerated in the phenol solvent during extraction and stripping up to an amount of about 30 weight percent without any serious loss in selectivity of the phenol. In the separation of cyclohexene from benzene, the relative volatility with 75 wt. percent pure phenol and 25% hydrocarbon is 1.35 (cyclohexene/benzene). With 25 percent of the phenol replaced by the chroman-coumaran mixture, the relative volatility was only reduced to 1.28.

Before the formation and use of the aromatic cyclic ethers was determined, the phenol solvent used in the extractive distillations was generally found to become contaminated with high-boiling, viscous materials referred to as sludge. These materials designated as sludge were considered to be composed of polymers and alkylated phenols. They are higher boiling than the aromatic cyclic ethers as well as higher boiling than phenol. Efforts were made to prevent formation of these sludge compounds and to purge them rapidly as they were formed. Furthermore, the reaction was considered to cause a loss of phenol and hydrocarbons converted to valueless sludge materials.

There is evidence that the high boiling sludge compounds are formed to a substantial extent by polymerization of some diolefins, particularly cyclic diolefins, and that the reaction is catalyzed by peroxides.

The aromatic cyclic ethers, on the other hand, are stable compounds that can be tolerated in the phenol solvent. They are formed by reaction of open chain diolefins, e. g. methylpentadiene in mole per mole proportion with phenol and can be isolated.

Data pertaining to differences between the cyclic ethers and the higher boiling sludge materials showing how the cyclic ethers can be completely separated by distillation is given in the following table, which describes the distillation of a used phenol solvent.

*Table II*

|  | Cut boiling point, ° C., at 760 mm. Hg | Acetyl number (cg./g.) |
|---|---|---|
| Cut 1 (phenol) | 182 | 1.06 |
| Cuts 5–7 | 234–238 | 0.018–0.024 |
| Cut 10 | 272 | 0.545 |

To demonstrate the advantage of recovering phenol distillate with aromatic cyclic ethers data on continuous distillation of a phenol in a purifying still, such as column 11 is shown in the following table:

*Table III.—Distillation of recycle phenol containing aromatic cyclic ethers and sludge*

|  | 1 | 2 |
|---|---|---|
| Feed: |  |  |
| Rate, vol./hr | 600 | 600 |
| Ether and sludge, mol percent | 5.6 | 5.6 |
| Temp., ° C | 174 | 174 |
| Overhead: |  |  |
| Rate, vol./hr | 576 | 500 |
| Ether, mol. percent | 4.1 | 0.4 |
| Vapor temp., ° C | 182 | 182 |
| Yield, weight percent of feed | 95.8 | 82.5 |
| Bottoms: |  |  |
| Rate, vol./hr | 24 | 100 |
| Phenol, liq. vol. percent | 1.0 | 8.0 |
| Yield, weight percent of feed | 4.5 | 17.5 |
| Temp., ° C | 269 | 218 |

The foregoing Table III illustrates how a substantially improved recovery of phenol was obtained in Run 1 when taking overhead part of the aromatic cyclic ether as compared to Run 2. The phenol-ether distillate thus taken overhead in the purifying column 11 was recycled to the extraction column 1. The phenol distillate containing up to about 5 mol percent of the ethers was recycled to an extractive distillation unit in which benzene was being extracted and a non-aromatic hydrocarbon distilled. The aromatic cyclic ether acted as a diluent without adverse effects on the relative volatility of the non-aromatic compound to the benzene.

It has been pointed out that the aromatic ether type compounds which can be separated from the phenol and the higher boiling phenol sludge compounds serve as a very good heating medium and diluent on account of their thermal stability and chemical stability. They may be employed as a heating medium or flux in other reactions. They are also indicated to be useful as solvents for various organic compounds including insecticidal compounds of the DDT type. The aromatic ethers of the chroman, chromene, and coumaran types may be reacted with halogens. It has been observed that halogens replace hydrogen atoms in the chroman and coumaran structure. They may be used as additives in other organic compositions, including motor fuels, diesel fuels, lubricating oils, greases, and plasticizers. They may be used as raw materials for organic synthesis considering that the aromatic ether has a structure similar to a portion of the molecule of vitamin E.

What is claimed is:

1. The process which comprises reacting, at elevated temperatures of 120° to 270° C. in the presence of an iron metal catalyst, a mixture of open-chain $C_5$ and $C_6$ diolefins contained in a hydrocarbon fraction selected from the group consisting of benzene, toluene, and xylene fractions, with a phenolic solvent selected from the group consisting of phenol and cresylic acid, separating and recovering from higher boiling sludge materials the resulting mixture of aromatic cyclic ethers, whose structures result from the attachment of one molecule of said diolefins to one molecule of said phenolic solvent, said ethers having the dicyclic ring structures of the compounds selected from the group consisting of chroman, chromene, and coumaran.

2. The process which comprises reacting, in an extractive distillation zone in the presence of an iron metal catalyst under distillation conditions including temperatures of 120° to 270° C., a mixture of open-chain $C_5$ and $C_6$ diolefins contained in a benzene concentrate with a phenolic solvent selected from the group consisting of phenol and cresylic acid; stripping the benzene from the resulting phenolic solvent extract thereof in a second distillation zone; thereafter, in a third distillation zone, distilling overhead from higher boiling sludge materials in said phenol extract, a mixture of phenolic solvent and $C_{11}$–$C_{13}$ aromatic cyclic ethers, the structures of said ethers resulting from the attachment of one molecule of said diolefins to one molecule of said phenolic solvent, said ethers having the ring structures of the compounds selected from the group consisting of chroman, chromene, and coumaran; and returning said mixture of phenolic solvent and aromatic ethers to said extractive distillation zone.

3. The process for producing a mixture of aromatic cyclic ethers having empirical formulas of $C_{12}H_{14}O$ and $C_{12}H_{16}O$ which comprises reacting phenol with a mixture of $C_6$ diolefins contained in a benzene concentrate in an extractive distillation zone at temperatures of 120° to 270° C. in the presence of an iron metal catalyst; passing the resulting extract of benzene in phenol containing said aromatic cyclic ethers to a second distillation zone and stripping the benzene therefrom; passing the remaining ether-containing phenol extract to a third distillation zone and there distilling the phenol from the residue containing said aromatic ethers; passing said residue to a fourth distillation zone and there distilling overhead at 230° to 255° C. the product mixture of aromatic cyclic ethers whose structures result from the attachment of one molecule of said diolefins to one molecule of said phenol, said ethers having the dicyclic ring structures of the compounds selected from the group consisting of chroman, chromene, and coumaran.

4. A process according to claim 3 wherein said $C_6$ diolefins are methylpentadiene isomers.

5. The process according to claim 1 in which the said diolefins have six carbon atoms.

6. The process according to claim 1 in which the said diolefins are conjugated diolefins.

7. The process according to claim 1 in which the said phenolic solvent is phenol.

8. The process according to claim 2 in which the phenolic solvent is phenol.

9. The process according to claim 2 in which the said diolefins have six carbon atoms.

10. The process according to claim 2 in which the said diolefins are conjugated diolefins.

References Cited in the file of this patent

UNITED STATES PATENTS

| | | |
|---|---|---|
| 2,320,746 | Paul | June 1, 1943 |
| 2,510,937 | Tadema | June 6, 1950 |
| 2,518,474 | Hudson | Aug. 15, 1950 |

FOREIGN PATENTS

| | | |
|---|---|---|
| 374,142 | Germany | Apr. 20, 1923 |

OTHER REFERENCES

Clemo et al.: J. Chem. Soc., 1955, pp. 4347–4349.